US006930688B1

(12) United States Patent
Pether et al.

(10) Patent No.: US 6,930,688 B1
(45) Date of Patent: Aug. 16, 2005

(54) GENERATOR OF GRAPHICS IN COMPUTER SYSTEM

(75) Inventors: David Neil Pether, Wokingham (GB); Stephen John Gibbon, Eastleigh (GB)

(73) Assignee: LSI Logic Corporation, Milpitas, CA (US)

(*) Notice: Subject to any disclaimer, the term of this patent is extended or adjusted under 35 U.S.C. 154(b) by 484 days.

(21) Appl. No.: 09/739,956

(22) Filed: Dec. 19, 2000

Related U.S. Application Data

(60) Provisional application No. 60/249,152, filed on Nov. 16, 2000.

(51) Int. Cl.[7] ............................................. G06E 15/16
(52) U.S. Cl. .................... 345/502; 345/441; 345/610; 345/519; 345/589
(58) Field of Search ................. 345/610, 589, 345/418, 204, 441, 781, 519, 502

(56) References Cited

U.S. PATENT DOCUMENTS

| | | | | |
|---|---|---|---|---|
| 4,255,785 A | * | 3/1981 | Chamberlin | 712/205 |
| 5,129,060 A | | 7/1992 | Pfeiffer et al. | 395/166 |
| 5,214,753 A | * | 5/1993 | Lee et al. | 345/610 |
| 5,416,897 A | | 5/1995 | Albers et al. | 395/143 |
| 5,500,654 A | | 3/1996 | Fujimoto | 345/132 |
| 5,651,106 A | * | 7/1997 | Ashburn | 345/441 |
| 5,699,087 A | * | 12/1997 | Krenik et al. | 345/589 |
| 5,796,391 A | * | 8/1998 | Chiu et al. | 345/204 |
| 5,986,658 A | * | 11/1999 | Prouty | 345/418 |
| 6,348,919 B1 | * | 2/2002 | Murphy | 345/421 |
| 2002/0149626 A1 | * | 10/2002 | Ozcelik et al. | 345/781 |

FOREIGN PATENT DOCUMENTS

| | | |
|---|---|---|
| EP | 0440077 | 8/1991 |
| JP | 4-349499 | 4/1992 |
| JP | 7-296188 | 7/1995 |
| JP | 8-187243 | 8/1996 |
| JP | 2000-182024 | 6/2000 |

OTHER PUBLICATIONS

James Foley, Andries van Dam, Steven Feiner, and John Hughes. Computer Graphics: Principles and Practice, 2d Edition. Addison-Wesley Publishing Company, 1990, pp 67-72 and 873-874.*

* cited by examiner

*Primary Examiner*—Kimbinh T. Nguyen
(74) *Attorney, Agent, or Firm*—Christopher P. Maiorana, P.C.

(57) ABSTRACT

An apparatus for generating graphics is connectable in a computer system between a system processor and a system memory by way of a data bus. The apparatus comprises two registers for the storage of X and Y coordinates respectively of a single pixel. The coordinates are applied to an address conversion calculation unit for calculating a linear memory address corresponding to the pixel coordinates and the data representative of the pixel is stored in the system memory at the calculated address. The two registers are memory mapped to appear at two or more locations in memory such that operation of the apparatus is dependent on the memory location used by each register. The apparatus carries out many of the repetitive operations required in the generation of graphics.

21 Claims, 3 Drawing Sheets

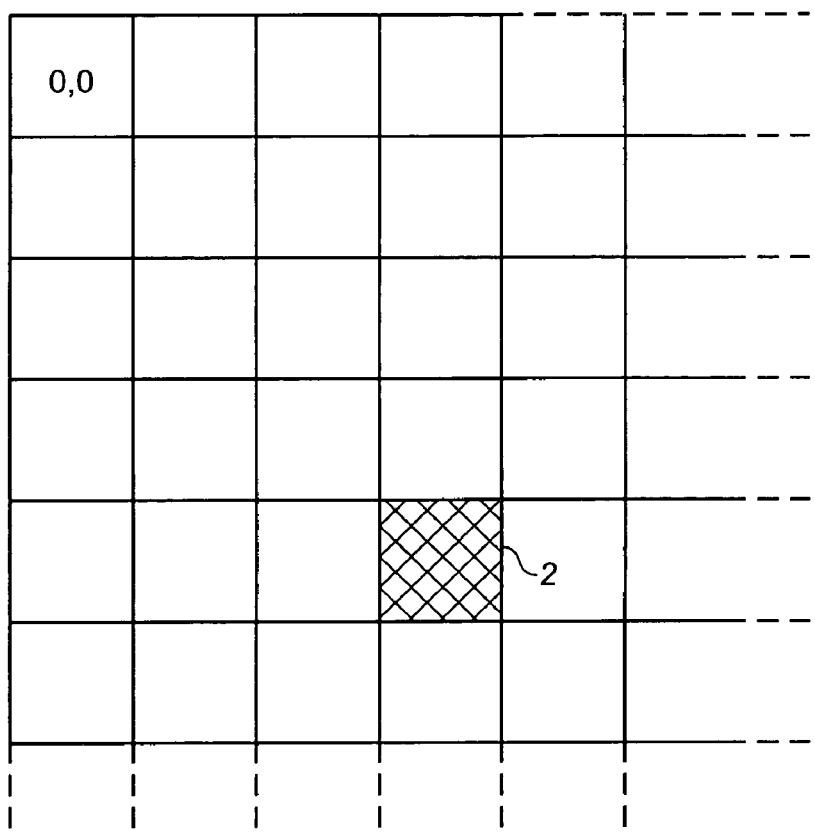
FIG._1
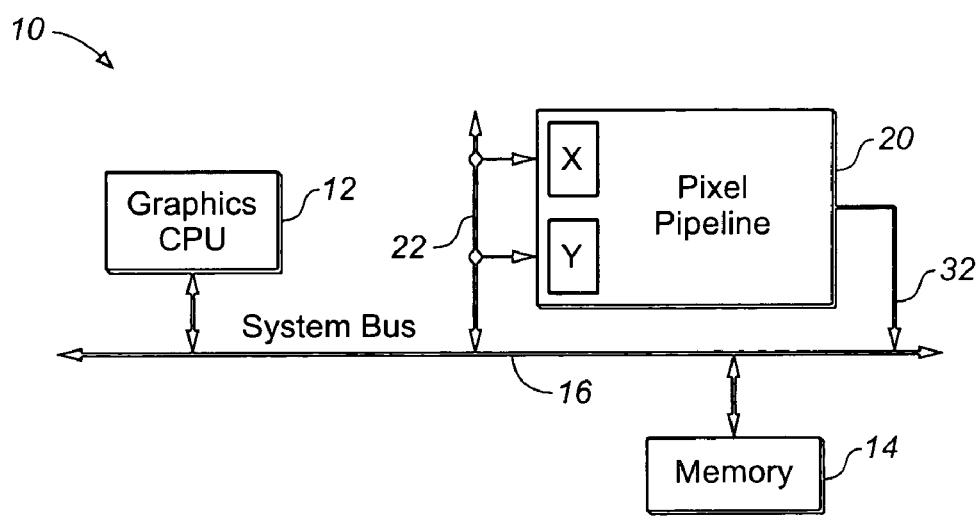
FIG._2

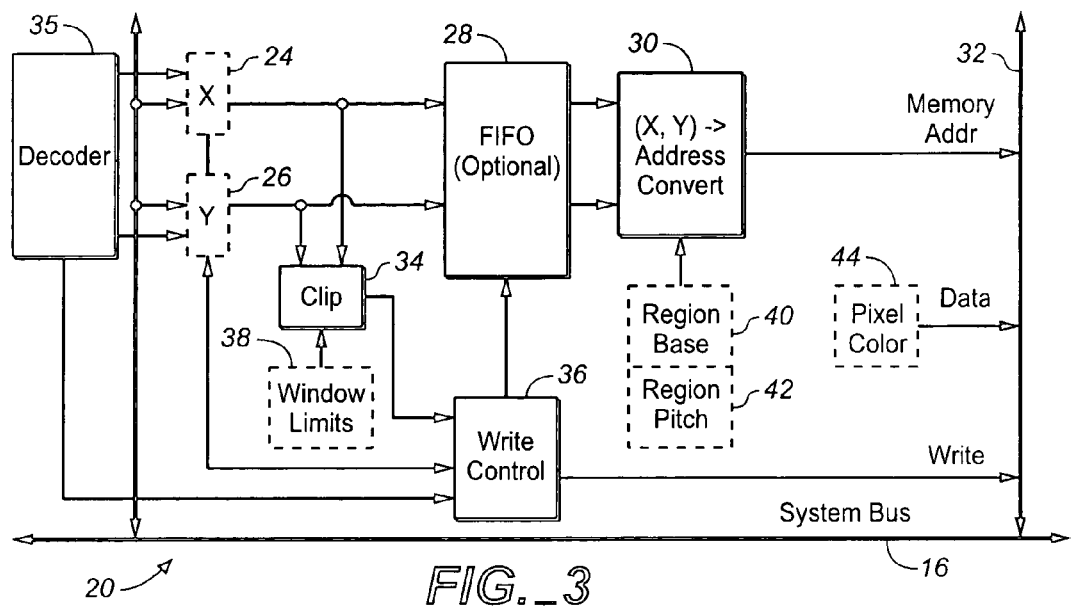
FIG._3
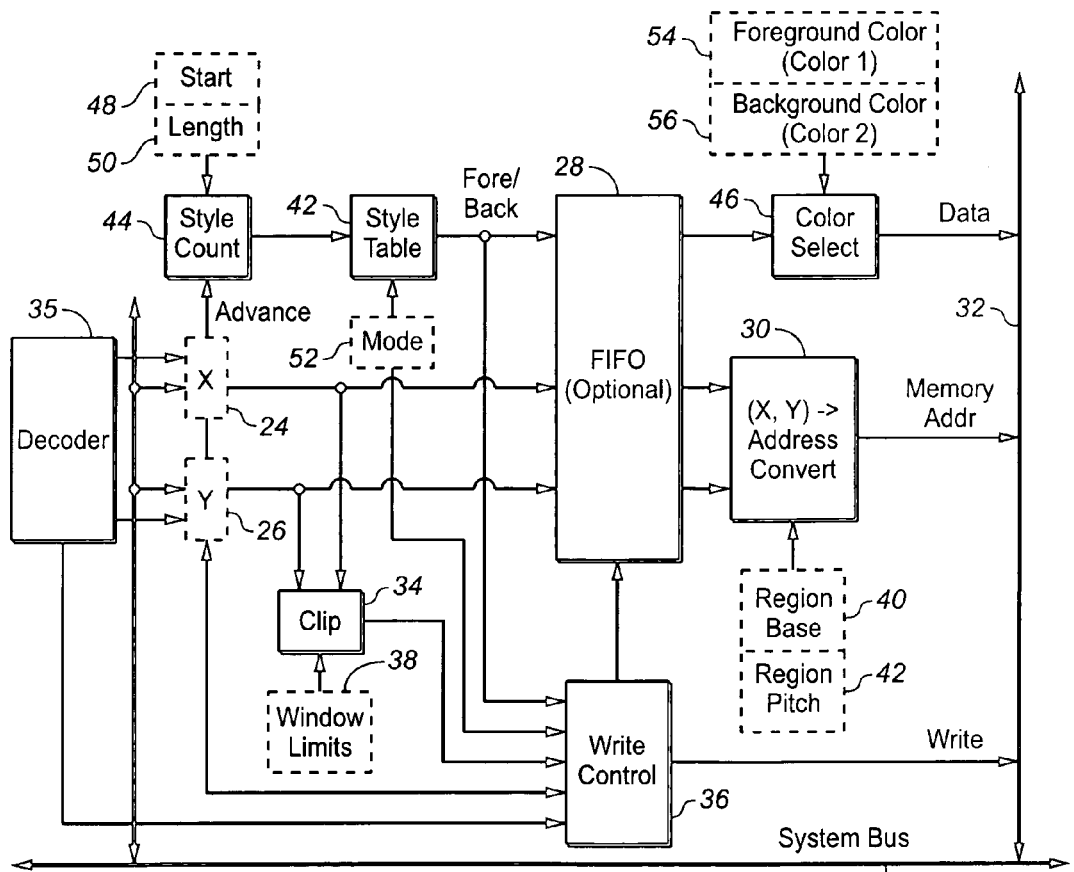
FIG._4

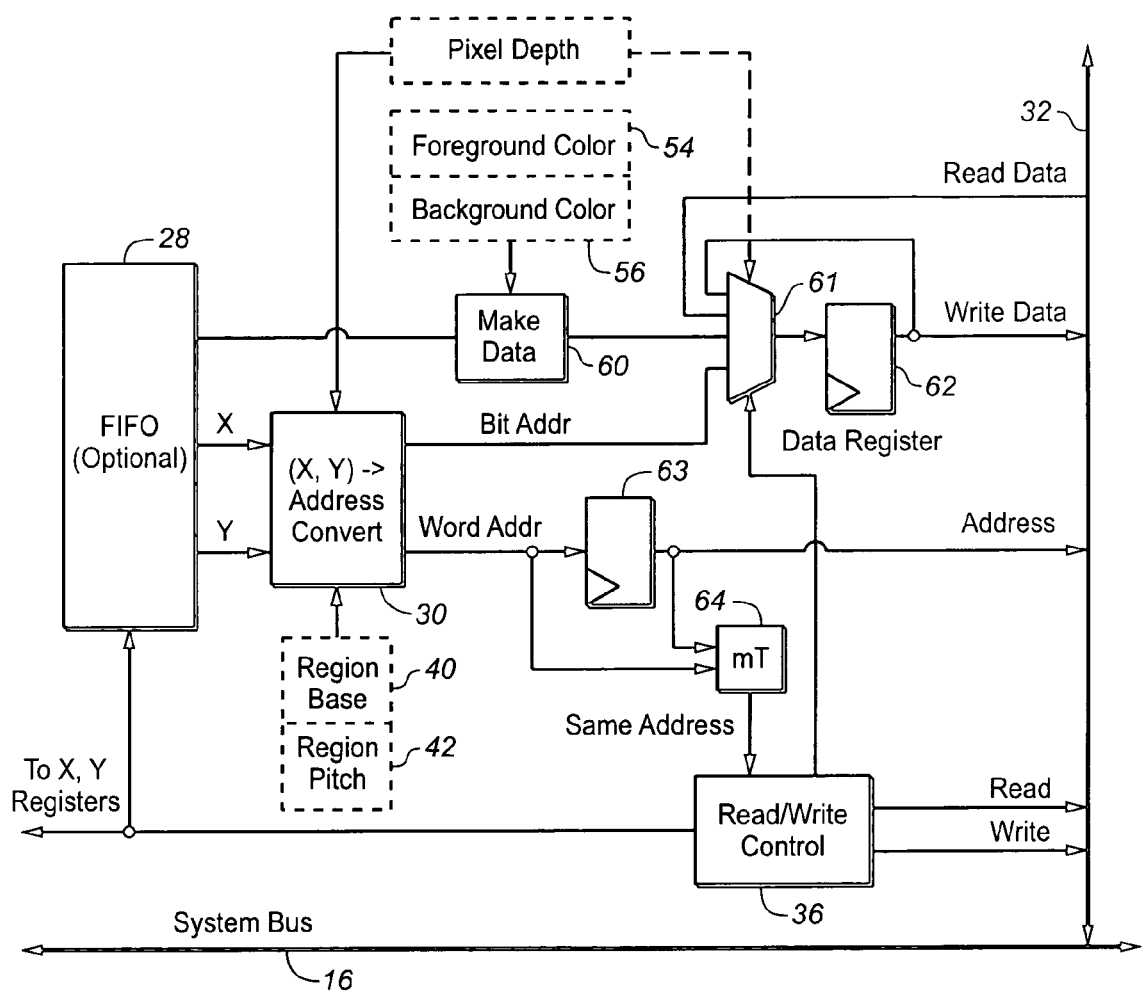
FIG._5

GENERATOR OF GRAPHICS IN COMPUTER SYSTEM

This application claims the benefit of U.S. Provisional Application No. 60/249,152, filed Nov. 16, 2000 which is hereby incorporated by reference in its entirety.

FIELD OF THE INVENTION

The present invention relates to the generation of graphics in computer systems and particularly, but not exclusively, to a method and/or apparatus for generating graphics which reduces the burden on the system processor of carrying out the repetitive operations needed for graphics generation.

BACKGROUND OF THE INVENTION

In order to produce fast graphics at high resolution on a display screen, obtaining the maximum performance from any microprocessor responsible for generating graphic is desirable. Known computer systems for generating graphics often use specialized processors (CPUs) which incorporate features designed to speed up certain common drawing routines.

The generation of graphics in such computer systems usually involves the calculation of the display coordinates of every point in a given shape and the conversion of these coordinates into an address in the system memory where the data for each point is to be stored. This is normally carried out by the system CPU or, alternatively, a dedicated graphics CPU.

The display screen is conventionally divided into a large number of elements known as pixels which are arranged in an array. The location of any given pixel in the array is defined relative to the top left corner by X,Y coordinates. For example, referring to FIG. 1, if the pixel at the top left corner of the display has coordinates (0, 0) then a pixel 2 occupying a position on the display of 4 pixels from the left hand column and 5 pixels down from the top row has coordinates (3, 4).

The brightness and color information for each pixel is stored at a memory address in the system memory for access by a system display processor or adaptor which converts the pixel information into a visible point on the display. The memory address itself represents the pixel coordinates and is a single number generated by the CPU. Generation of the memory address is achieved by a calculation which is performed by the CPU on the X,Y values of the pixel coordinates. A common routine for calculating the memory address is:

$$\text{Address} = \text{Base} + X + Y*\text{Pitch}$$

where:
Base=the first address in the memory which is allocated to the storage of pixel data;
X and Y=the values of the pixel coordinates as described above; and
Pitch=the number of pixels horizontally across the display.

It can be seen that the Base value is the address location in the system memory corresponding to the pixel coordinate (0, 0) of FIG. 1 and the Pitch value represents the number of memory addresses required for a single row of pixels.

While the above calculation is a relatively simple one, it is required to be computed for every pixel plotted. Since a display may have up to and above one million pixels, the need for the CPU to perform the calculation for all of the pixels in a single display frame greatly reduces the performance of the CPU. This may be disadvantageous since the CPU may be required to perform other functions, in addition to the generating of graphics, which further reduce the operational speed and performance of the CPU. Moreover, the provision within a computer system of a CPU dedicated solely to the generation of graphics is not necessarily a solution to the problem since it may be undesirable to have different types of processors within a single system design.

SUMMARY OF THE INVENTION

The present invention concerns an apparatus for generating a region of graphics on a display, the apparatus comprising a register, a calculation circuit and a control circuit. The register may be configured to store coordinates of a pixel to be drawn on the display. The calculation circuit may be configured to calculate an address of a location in a memory for storage of data corresponding to the pixel in response to the coordinates. The control circuit may be configured to control the register and the calculation circuit to cause the data to be written to and stored in the memory at the calculated address.

The objects, features and advantages of the present invention include an improved method and apparatus for drawing graphics in order to address the problem of the requirement for faster drawing of graphics at a higher resolution.

DESCRIPTION OF THE DRAWINGS

The present invention is described hereinafter, by way of example only, with reference to the accompanying drawings, in which:

FIG. 1 is a diagram representing a region of a display on a screen showing an array of pixels;

FIG. 2 is a block diagram of part of a computer system incorporating a preferred form of apparatus according to the invention;

FIG. 3 is a block diagram of a part of the apparatus shown in FIG. 2 in greater detail;

FIG. 4 is a block diagram of a first modification to the apparatus of FIG. 3; and FIG. 5 is a block diagram of a second modification to the apparatus of FIG. 3.

DETAILED DESCRIPTION OF THE PREFERRED EMBODIMENT(S)

The present invention provides an apparatus for generating a region of graphics on a display which comprises a register circuit, a calculation circuit and a control circuit. The register may store the coordinates on the display of a pixel to be drawn. The calculation circuit may receive the coordinates from the register and calculate the address of a location in a memory for storage of data corresponding to the pixel in dependance on the coordinates. The control circuit may control the register and the calculation circuit to cause the data to be written to and stored in the memory at the calculated address.

The present invention may provide a method of generating a region of graphics on a display, the method comprising the steps of (A) receiving X and Y coordinates of a pixel to be drawn in the region; (B) storing the coordinates; (C) calculating the address of a location in a memory for storage of data corresponding to the pixel in dependance on the coordinates; and (D) causing the data to be written to and stored in the memory at the calculated address.

The step of storing the coordinates preferably comprises storing X and Y coordinates of the pixel in first and second registers.

The calculation circuit conveniently calculates the address using the equation:

$$\text{Address} = \text{Base} + A + B*\text{Pitch}$$

where Base and Pitch are predetermined constants;
A is one of the X and Y coordinates; and
B is the other of the X and Y coordinates.

In a preferred form of the invention, the register circuit comprises first and second registers for storing X and Y coordinates respectively of the pixel. The first register is memory mapped to first and second locations in the memory and the second register is memory mapped to third and fourth locations in the memory. The first to fourth memory address locations are monitored and a location signal is applied to the write control circuit representative of the address location being written to.

The calculating circuit calculates the memory address for a pixel coordinate in response to one of the following: an X coordinate being sent to the X-register at a preselected one of the first and second memory addresses; or a Y coordinate being sent to the Y-register at a preselected one of the third and fourth memory addresses.

In a further preferred embodiment, a style table is provided for storing data corresponding to a predetermined pattern or style for each pixel to be drawn. A style counter indexes the data in the style table and generates a style data signal corresponding to the indexed data. The first register is memory mapped to first to fourth locations in the memory and the second register is memory mapped to fifth to eighth locations in the memory. The first to eighth memory address locations are monitored and a location signal is applied to the write control circuit representative of the address location being written to and the style counter circuit is indexed in response to the address location being written to. The calculating circuit calculates the memory address for a pixel coordinate in response to one of the following: an X coordinate being sent to the X-register at the second or fourth memory addresses; or a Y coordinate being sent to the Y-register at the sixth or eighth memory addresses.

The style counter is advanced in response to one of the following: an X coordinate being sent to the X-register at the third or fourth memory addresses; or a Y coordinate being sent to the Y-register at the seventh or eighth memory addresses.

FIG. 2 shows part of a computer system 10 incorporating a pixel pipeline 20. The system 10 comprises a system or graphics central processor unit (CPU) 12 which is connected to a system memory 14 by a system data bus 16. The pixel pipeline 20 is connected to the system bus 16 and is therefore able to communicate with the CPU 12 and the system memory 14.

The pixel pipeline 20 is shown in more detail in FIG. 3. The pixel pipeline 20 is connected to the system bus 16 by dedicated input and output data busses 22, 32 and has first and second X and Y data registers 24, 26 which are each connected to the input data bus 22. The data registers 24, 26 are memory-mapped such that they appear to the CPU 12 as memory locations having contents that can be written to and read from using normal "store" and "fetch" operations. The data register 24 (e.g., X-register) is used for the temporary storage of the X value for a pixel coordinate while the data register 26 (e.g., Y-register) is used for the temporary storage of the Y value of the pixel coordinate, as described below.

Each data register 24, 26 has an output which is connected to a data buffer 28. The data buffer 28 has two outputs corresponding to the outputs from the data registers 24, 26 which are input to a circuit 30. In one example, the circuit 30 may be implemented as an address conversion calculation block (ACCB). The circuit 30 converts the X and Y values of the pixel coordinates into a number representing an address in memory at which data for the pixel is to be stored. The ACCB 30 has an output connected to the output data bus 32.

The pixel pipeline 20 also includes a clip unit 34 connected to the output of the data registers 24, 26, a write control unit 36 connected to the data registers 24, 26, the input buffer 28, the ACCB 30, the clip unit 34 and the output data bus 32, and an address decoder 35. The purpose of these is described below.

The operation of the pixel pipeline 20 of FIG. 3 will now be described. When the CPU 12 calculates the coordinates of a first pixel of a shape such as a rectangle or a circle that are to be drawn on a display screen, the X and Y values for the pixel are sent sequentially to the pixel pipeline 20. The X value is presented to the X-register 24 and the Y value is presented to the Y-register 26.

The data registers 24, 26 apply respective X and Y coordinate values to the clip unit 34. The clip unit 34 checks each value to ensure that the corresponding pixel lies within a predetermined clipping window. The clip unit 34 may comprise a set of comparators which compare the coordinate data with the clipping window limits stored in a window limits register 38. The clipping window is defined by the CPU 12. The limits of the window normally corresponding to the limits of the display. If the pixel location falls outside the clipping window, then the pixel is discarded. If the pixel location falls within the clipping window, then the address calculation proceeds.

Such clipping is important in situations where only a small part of a large shape is to be visible on the display so that there is no point in plotting the hidden part of the large shape. Conventionally, it is extremely time consuming for the CPU 12 to test every pixel against the clipping limits. The handling of such comparisons by the pixel pipeline 20 may significantly reduce the burden on the CPU 12.

If the pixel coordinate lies outside the clipping window, the write control unit 36 does not continue with the processing and the data in the data registers 24, 26 is ignored. In this particular example, the write control unit 36 does not allow the buffer 28 to pass the coordinate data to the ACCB 30. The data registers 24, 26 then receive a further set of coordinates from the CPU 12. If, however, the pixel coordinate lies within the clipping window, the write control unit 36 continues with the processing and loads data from the data registers 24, 26 into the data buffer 28.

The presence of the data buffer 28 is optional and will depend upon the relative speed of operation of the CPU 12 and the memory 14 in the computer system 10. In general, processes for plotting common graphics shapes (e.g., lines and circles) allow the CPU 12 to calculate a number of X,Y coordinates at a very high speed. Such processing usually occurs in the form of short bursts of data having a much lower average rate. For example, during the calculation of a circle, once the CPU 12 has calculated (e.g., a trigonometric calculation) a point on the perimeter on the circle, the CPU 12 is quickly able to calculate the coordinates of a number of other points using lines of symmetry. Thus, the coordinates of these points will be generated and presented from the CPU 12 at a high rate. However, the CPU 12 then takes time to calculate the next point on the perimeter on the circle using trigonometry.

Consequently, the CPU 12 presents the pixel coordinates in the form of short bursts of data having relatively long intervening periods. The data buffer 28 acts to balance or average the input and output data rates to ensure that data is not lost.

The X and Y coordinate values for each pixel are presented by the buffer 28 and applied to the ACCB 30. The ACCB 30 converts the pixel coordinates into a single number representative of an address in the system memory 14 using the following calculation:

$$\text{Address} = \text{Base} + X + Y * \text{Pitch}$$

The Base and Pitch values in the calculation are defined by the CPU 12 and are held in base and pitch registers 40, 42 respectively from which the values are read by the ACCB 30.

The calculated memory address is then presented from the ACCB 30 to the output data bus 32. The ACCB 30 also receives a data value for the pixel, representative of the pixel color, from a pixel color register 44. This data value is defined by the CPU 12. The pixel information, comprising the memory address and the data value, is then applied to and stored in the system memory 14 via the output data bus 32 and the system bus 16 under the control of the write control unit 36. Thus, the data stored at the selected memory address is a value representing the color for the pixel to be drawn. The selected memory address is representative of the pixel location on the display.

It can be seen, therefore, that the pixel pipeline 20 is able to perform a number of simple but repetitive calculations which would normally be performed by the system CPU 12. This reduces the burden on the CPU 12 to perform such tasks and thus increases the performance and efficiency of the CPU 12.

An improvement to the above-described operation of the pixel pipeline 20 is achieved by the use of double memory-mapping of each of the data registers 24, 26. The registers 24, 26 are memory-mapped and each is arranged to appear to the CPU 12 as two separate locations in memory each having a unique memory address. Thus the CPU 12 sees two possible X-registers at memory addresses N and N+1 and two Y-registers at memory addresses N+2 and N+3. These memory addresses need not be consecutive but are chosen so for convenience. In this example, memory addresses N to N+3 will generally be from 2000 to 2003 with addresses 2000 and 2001 corresponding to the X-register 24 and addresses 2002 and 2003 representing the Y-register 26.

It is often the case that a sequence of pixel coordinates may be constant in a particular direction. For example, in the case of a horizontal line, the Y coordinate value does not change along the length of the line. In order to remove the necessity to assemble an X,Y coordinate pair for each pixel, it is possible merely to update the X coordinate in the X-register 24 and perform the address calculation on the new X coordinate and the old Y coordinate. Such an address calculation is achieved by making the action taken by the pixel pipeline 20 dependent upon the address used to store the pixel coordinate in the respective register 24 or 26. The address decoder 35 monitors each of the four address locations N to N+3 to see which is written to and applies an address location signal to the write control unit 36. In response to the four addresses N to N+3, the ACCB 30 performs an address calculation in response to the address of the X or Y-register being updated.

Using the example described above, where the X-register 24 has memory addresses of 2000 and 2001 and the Y-register 26 has addresses of 2002 and 2003, the operation performed when coordinates are written to each address may be as follows:

If an X coordinate is sent to the X-register memory address 2000 then the X-register 24 is updated but the write control unit 36 does not instruct the address calculation by the ACCB 30;

If an X coordinate is sent to the X-register memory address 2001 then the X-register 24 is updated and the write control unit 36 instructs the address calculation by the ACCB 30 using the new X coordinate and the existing Y coordinate;

If a Y coordinate is sent to the Y-register memory address 2002 then the Y-register 26 is updated but the write control unit 36 does not instruct the address calculation by the ACCB 30;

If a Y coordinate is sent to the Y-register memory address 2003 then the Y-register 26 is updated and the write control unit 36 instructs the address calculation by the ACCB 30 using the new Y coordinate and the existing X coordinate.

It will be seen that the address calculation by the ACCB 30 is generally triggered if the X value is written to the odd numbered X-register address 2001 or the Y value is written to the odd numbered Y-register address 2003.

Thus, the X-register 24 may be updated by writing the value either to address 2000 or to address 2001, but only the latter instructs the pixel pipeline 20 to perform the address calculation using the old Y coordinate and the new X coordinate. Therefore, in the calculation of, for example, a horizontal line, the X and Y coordinates of the first pixel in the line would be input sequentially to register addresses 2000 and 2003 which instructs the pixel pipeline 20 to perform the ACCB calculation using those values of X and Y. For generating the remaining pixels on the line, the CPU 12 merely calculates the X coordinates of the remaining pixels and sequentially inputs them to address location 2001 which updates the X-register 24 and then instructs the pixel pipeline 20 to perform the ACCB calculation using the new X coordinate and the existing (constant) Y coordinate. There is no need for the CPU 12 to assemble an X, Y pair for each pixel, nor to update both data registers 24, 26 in situations where one value is known to be constant for a series of pixels.

While the graphics CPU 12 remains responsible for calculating the location of every X, Y point (pixel) for a shape, the pixel pipeline 20 performs the following operations for each pixel of the shape:

1 Accepts each pixel coordinate X, Y value from the graphics CPU 12;

2 Checks that the pixel falls within a given rectangular clipping window and discards the pixel if it falls outside the window. Plotting continues with the next two steps if the pixel is within the window;

3 Calculates a linear memory address corresponding to the X, Y coordinate;

4 Writes the pixel as a point of color to the calculated address location in memory.

Referring now to FIG. 4, a block form of a modification to the pixel pipeline 20 of FIG. 3 is shown. The modification comprises the addition of a so-called style table 42, a style counter 44 and a color select unit 46.

A common feature of line drawing operations in graphics is the need to incorporate a "style". A style may include such details as width, texture, end-cap design and dashed effects. Dashed lines may be made up of colored or opaque sections with transparent parts between them, or may be a pattern of two colors alternating along the line. The modification shown in FIG. 4 allows the pixel pipeline 20 to draw dashed or two-color lines with minimal intervention by the CPU 12.

The style table 42 is a region of local memory, for example a set of registers, or a small random access memory (RAM), which holds a series of single bits representing the pattern of the style in which the line is to be drawn. Each bit in the style table 42 indicates the color of a corresponding pixel. For example, a "1" might represent a "foreground" color and a "0" may represent a "background" color. In this embodiment, therefore, a series of equal-sized dashes may be represented by;
001100110011;

while a mixture of dots and dashes may be represented by:
0010011100100111.

The style table 42 is of sufficient size to hold the longest non-repeating bit pattern which may be required for drawing operations. The contents of the style table 42 are updated by the CPU 12 when a new pattern of dots and dashes is required.

The style counter 44 is used to index the style table 42 and is advanced along the style table 42 as the line is drawn. The incrementing of the style counter 44 depends on the thickness of the line. For a line 1 pixel wide, the style counter 44 may be incremented after the plotting of every pixel. For a line 3 pixels wide, the style counter 44 may be incremented after the plotting of every third pixel. Wide lines may have many pixels to be plotted across the line for each step along the line. The start position of the style counter 44 in the style table 42 is determined by a start value set by the CPU 12 and stored in a start register 48. Storing the start position allows any dashed effect on a line to be continued correctly when the line is drawn in a number of stages as in the case of, for example, zig-zag lines. The point in the style table 42 at which the style counter 44 returns to the start point is determined by a length value set by the CPU 12 and stored in a length register 50.

Thus, the interval at which the line style repeats can be any number of pixels up to the maximum size of the style table 42.

The style table 42 may operate in a number of modes determined by a value set by the CPU 12 and stored in a mode register 52. In this embodiment, the value set in the mode register 52 represents one of three states, these being:
"solid"—the output of the style table 42 is ignored and all pixels are plotted;
"dashed"—the pixel is plotted if the output of the style table 42 is a "1" (e.g., a foreground color) but ignored if the output of the style table 42 is a "0" (e.g., a background color), the background color effectively being transparent;
"double dashed"—all pixels are plotted and the style table 42 output determines whether the pixel is drawn in foreground or background color.

The color for each pixel to be plotted is selected by the color select unit 46 from color registers 54, 56 which store the information determining respectively the foreground (e.g., color 1) and background (e.g., color 2) colors. The color select unit 46 is a multiplexer or data selector which selects the foreground or background color data bits in response to a fore/back signal from the style table 42. A fore signal selects color 1 and a back signal selects color 2.

In the embodiment of FIG. 4, the X-register 24 and the Y-register 26 are each memory-mapped to four locations in the memory, these being N to N+7. Thus, for example, the X-register 24 may be arranged to appear at memory addresses N to N+3 while the Y-register may be mapped to appear at memory addresses N+4 to N+7.

As in the previous embodiment, the action taken by the pixel pipeline 20 depends on the memory address used to store the pixel coordinates in the registers 24, 26. If, as an example we represent memory addresses N to N+7 by 4000 to 4007 respectively, the operations performed for each memory address may be as follows:
If an X coordinate is sent to the X-register memory address 4000 then the X-register 24 is updated, but the write control unit 36 does instruct the address calculation by the ACCB 30;
If an X coordinate is sent to the X-register memory address 4001 then the X-register 24 is updated and the write control unit 36 instructs the address calculation by the ACCB 30 using the new X coordinate and the existing Y coordinate;
If an X coordinate is sent to the X-register memory address 4002 then the X-register 24 is updated and the style counter 44 is advanced but the write control unit 36 does not instruct the address calculation by the ACCB 30;
If an X coordinate is sent to the X-register memory address 4003 then the X-register 24 is updated and the write control unit 36 instructs the address calculation by the ACCB 30 using the new X coordinate and the existing Y coordinate. The style counter 44 is advanced;
If a Y coordinate is sent to the Y-register memory address 4004 then the Y-register 26 is updated but the write control unit 36 does not instruct the address calculation by the ACCB 30;
If a Y coordinate is sent to the Y-register memory address 4005 then the Y-register 26 is updated and the write control unit 36 instructs the address calculation by the ACCB 30 using the new Y coordinate and the existing X coordinate;
If a Y coordinate is sent to the Y-register memory address 4006 then the Y-register 26 is updated but the write control unit 36 does not instruct the address calculation by the ACCB 30. The style counter 44 is advanced;
If a Y coordinate is sent to the Y-register memory address 4007 then the Y-register 26 is updated and the write control unit 36 instructs the address calculation by the ACCB 30 using the new Y coordinate and the existing X coordinate. The style counter 44 is advanced An example is now described of the generation of a dashed line having a sequence of four, two-pixel dashes which alternate in color.

First, a style with the following bit pattern is selected in the style table 42 by the CPU 12.
00110011

The mode register 52 sets the mode of the style table 42 to "double dashed". The start position of the style counter 44 is set at zero by the start register 48 and the length of the repeating pattern or style to be drawn is set at eight by the length register 50. The appropriate colors, for example green and blue, are set in the first and second color registers 54, 56 respectively by the CPU 12.

The CPU 12 then calculates the pixel coordinates for the first pixel in the line and stores the X coordinate in the X-register 24 at memory address 4000 and the Y coordinate in the Y-register 26 at memory address 4007. The latter operation updates the Y-register 26 and instructs the pixel pipeline 20 to carry out the ACCB calculation and store the data for the pixel at the calculated memory address location. Since the style counter 44 initially indexes the first bit in the style table 42 (this being a "0") the style table 42 presents a "0" as the fore/back style signal representing a background color. This value is applied to the color select unit 46 which selects the background color (e.g., blue) from the second color register 56 and presents the data value representing that color onto the output data bus 32 for storage at the calculated location in memory. In addition, the use of address 4007 for storage of the Y coordinate instructs the style counter 44 to advance along the style table 42 by one.

The CPU 12 then calculates the coordinates of the next pixel in the line. If the line is horizontal, the Y coordinate will not change and so the CPU 12 applies the X coordinate of the next pixel to memory address 4003. This operation updates the X-register 24 with the new X coordinate and instructs the pixel pipeline 20 to perform the ACCB calculation on the new X coordinate and the existing Y coordinate. Since the style counter 44 is still indexing a zero in the style table 42, the data for the pixel output by the color select unit 46 is still representative of a blue color and thus, this data is output to the output data bus 32 for storage at the calculated location in memory. Storage of the new X coordinate at address 4003 also instructs the style counter 44 to advance by one in the style table 42.

The CPU 12 then calculates the position of the next pixel in the line. Again, the Y coordinate does not change and the new X coordinate is therefore stored at memory address 4003. This operation updates the X-register 24 with the new X coordinate and instructs the pixel pipeline 20 to perform the ACCB calculation on the new X coordinate and the existing Y coordinate. Since the style counter 44 is now indexing a "1", this value is applied as the fore/back style signal by the style table 42 to the color select unit 46 which selects the foreground color (e.g., green) from the first color register 54 and a data value representative of this color is output by the color select unit 46 to the output data bus 32 for storage at the calculated memory location. The further steps in the generation of this line will be clear from the above.

It will be appreciated that a similar line could have been produced using a style of 0101 where the Y coordinate of the first pixel is stored at memory address 4005 so that the style counter 44 is not incremented after the ACCB calculation is performed. This ensures that the second pixel will be the same color as the first. The X coordinate of the second pixel is then stored at 4003 to ensure that the style counter 44 is incremented after the ACCB calculation is performed such that the third pixel is in the new color. The X coordinate of the third pixel is stored at 4001 so that the style counter 44 is not incremented and the fourth pixel will be the same color as the third.

It will also be appreciated that simple styles can be derived from more complex styles stored in the style table 42. For example, the style 001001100111 . . . may generate a dashed line having increasing dash lengths. However, the dashed line described in the preceding paragraphs could also be derived from this style by setting the style counter 44 start position to "2" and the length value to "2". Thus, the storage of only a small number of complex styles allows the derivation of a large number of more simple styles and hence the amount of memory required to store a selection of styles is reduced.

It can be seen that the above-described embodiment provides a number of advantages. Again, there is no requirement for the CPU 12 to assemble an X,Y coordinate pair for each pixel drawn, nor is there a need to update registers in situations where one value is known to be constant for a series of pixels (e.g., drawing a horizontal line). Furthermore, however, simultaneous advance of the style counter 44 may be achieved with pixel writing when required.

As can be seen therefore the pixel pipeline 20 performs the following operations:

1 It holds locally a reference pattern of bits representing a line style in a style table 42;

2 It steps through the style table 42 as the drawing operation moves along a line;

3 It assigns each pixel a foreground or background color according to the value of the current entry in the style table 42;

4 It can deem a pixel transparent so that the pixel is not plotted.

Referring to FIG. 5, a modification to the output stages of the pixel pipeline 20 of FIG. 4 is shown. The style count 44, style table 42, mode register 52, clip unit 34, X, Y-registers 24, 26 and address decoder 35 are omitted for clarity. Since the capacity of the system memory 14 and bandwidth of the system bus 16 are valuable resources within a high performance computer system, it is desirable to minimize the amount of memory used in drawing basic shapes and to minimize the number of write operations to the memory to reduce the demand on the system bus 16.

The pixel depth represents the number of memory bits used to store each pixel (e.g., the length of a binary number representing each pixel). In the previously described, a presumption that the pixel depth is equal to or greater than the smallest writeable unit or data "word" within the system memory 14 has been made. However, in many instances, the pixel depth will be considerably smaller than the smallest writeable unit in the system memory 14 such that data for two or more pixels to be drawn could be stored within a single memory word (e.g., at a single memory address).

During operation of the embodiment of FIG. 5, the X, Y coordinates for each pixel, together with the style signal value from the style table 42, are output by the data buffer 28 and are applied to the ACCB 30 and the make-data unit 60, respectively. The ACCB 30 calculates the linear memory address corresponding to the pixel coordinates and then splits the address into two parts. The first part is a "word address" representing the word in the system memory 14 which should contain the pixel data, while the second part is a "bit address" representing where within the memory word the data for the pixel is placed. In calculating the bit address for the pixel data, the ACCB 30 uses the pixel depth which represents the number of memory bits used to store each individual pixel.

In the modification of FIG. 5 the fore/back style signal is applied through the buffer 28 to a make data circuit 60 which is in turn connected through a multiplexer logic unit 61 and data register 62 to the bus 32. The make data circuit 60 is a multiplexer or data selector which selects the foreground or background color data bits in response to the fore/back signal from the buffer 28. The ACCB 30 has two outputs. One is for the bit address and is connected to the logic unit 61, while the second is for the word address and is connected through a delay register 63 and comparator 64 to the read/write control 36.

The arrangement of FIG. 5 generally enables two possible operations to be carried out using the data register 62:

1. The data register can be used to hold pixel data locally while new pixel data is inserted as part of a read-modify-write (RMW) operation;
2. The data register 64 can be used to combine data for multiple pixels all destined for the same word address in memory 14.

It is possible for these two operations to be used simultaneously.

The Read-Modify-Write (RMW) Operation

The data register 62 is of a size having the same number of bits as a full memory bus word. It is used to hold data for a pixel while new pixel data is inserted, replacing the original pixel data. After the ACCB 30 has calculated the word and bit addresses for a pixel, if the pixel depth of a pixel is less than the smallest writeable unit within memory (one example would be where each pixel is four bits long but the memory has byte-wide (8 bit) words) then the memory word to which the pixel is to be written is read from the memory 14 by the pixel pipeline 20 and stored in the local data register 62. The color data selected by the make data circuit 60 using the fore/back signal for the pixel is then inserted in the correct position within the word stored in the data register 62 by the logic unit 61 using the bit address for the pixel calculated by the ACCB 30 and applied to one input of the logic circuit 61. The new pixel data thus replaces the previous pixel data.

The resulting word is then written back to the system memory 14 via the output data bus 32 and the system bus 16. This is under the control of the write control unit 36. Such an operation is termed a "read-modify-write" operation since the memory word is firstly read from the memory 14, modified in the local data register 62 by the logic unit 61 and then written back to memory.

The steps can be summarised as follows:
1. Calculate the word and bit addresses;
2. Read the main memory 14 at the word address to retrieve the data word;
3. Store the word in the register 62;
4. Update the word at the bit address with the new pixel data;
5. Write the resulting word back to the memory address.

The Same Word Address

The word address for the pixel is applied both to a delay register 63 and to one input of a comparator unit 64. The delay register 63 delays the word address by one cycle or calculation of the ACCB 30 and applies its output to a second input of the comparator 64. The effect is that the comparator 64 compares the word address of the current pixel with the word address of the previous pixel. If the comparison by the comparator 64 indicates that the two compared word addresses are the same, this indicates that the two consecutive pixels are to be stored at the same word address in the memory 14.

In response to the result of this comparison the write control unit 36 then causes the multiplexor logic unit 61 to insert the data bits for the current data into the data which has previously been written to the local data register 62, and update the register 62 with the combined data. A single write operation to the system memory 14 is made at the end of the run of identical word addresses. This provides improved performance in terms of speed and bus occupancy.

When it is found that data for a pixel is to be written to the same memory word address as the previous pixel, as determined by the comparator 64 then the write control unit 36 instructs the local data register 62 to carry out one of two operations.

If the previous write operation has not yet taken place, this can be postponed and the data for this and the subsequent pixel are multiplexed together by the logic unit 61. The new data word is written back to the system memory 14 once all pixels for that single memory word have been combined. Advantageously, only one read and one write operation will have taken place.

Alternatively, if the previous write operation has already occurred, the local data register 62 will still contain the data which was previously modified and written. The data for the next pixel is then inserted into the correct position in the word by the logic unit 61 and the local data register 62 without performing a read operation. The new data word assembled in this way is then written back to the system memory 14. In this operation, it will be appreciated that two write operations but only one read operation will have taken place.

It will be appreciated that the logic unit 61, the local data register 62 and the comparator 64 are separate units and it is therefore possible for the read-modify-write operations and the "same address comparison" operation to be used simultaneously.

The embodiment of FIG. 5 performs the following operations:
1. Control of loading of the local data register 62;
2. Control of multiplex functions for insertion and combination of new pixel data within the local data register 62;
3. Suppression of the write operation when the same address flag indicates that the next pixel in the pixel pipeline is to be written to the same memory word.

The write control unit 36 is thus responsible for the control of loading of the local data register 62, the control of the logic unit 61 multiplexing and replacement functions for the insertion or combination of new pixel data within the local data register 62, and the suppression of the write operation when the comparator 64 indicates that the next pixel in the pixel pipeline is to be written to the same memory word.

It will be appreciated by those skilled in the art that the present invention is able to reduce considerably the time needed for the generation of graphics in a computer system and in doing so, significantly reduces the burden on the system CPU. The performance of the system is thus greatly increased with improved efficiency and the ability to generate much higher resolution graphics.

What is claimed is:

1. An apparatus for generating a region of graphics on a display, the apparatus comprising:
   a bus having a first address range and a second address range;
   a plurality of registers within said first address range configured to store an X coordinate and a Y coordinate of a pixel to be drawn on said display;
   a memory directly connected to said bus and responsive within said second address range;
   a calculation circuit configured to calculate an address in said second address range for storage of data corresponding to said pixel in dependence on said X and said Y coordinates;
   a control circuit configured to control writing of said data in said memory across said bus by driving said address onto said bus; and
   a clipping circuit for (i) comparing said x and said Y coordinates with predetermined clipping limits and (ii) generating a clipping signal configured to indicate that at least one of said X and said Y coordinates falls outside said predetermined clipping limits; wherein (i)

a first register of said registers is memory mapped to a first location and a second location in said first address range and (ii) a second register of said registers is memory mapped to a third location and a fourth location in said first address range.

2. The apparatus as claimed in claim 1, wherein said control circuit is further configured to inhibit writing of said data to said address in response to said clipping signal.

3. The apparatus as claimed in claim 1 wherein said control circuit is further configured to prevent calculation of said address in response to said clipping signal.

4. The apparatus as claimed in claim 1, wherein said data is discarded when at least one of said X and said Y coordinates fall outside said predetermined clipping limits.

5. The apparatus as claimed in claim 1, wherein said apparatus further comprises: an address decoder for (i) monitoring said first, said second, said third and said fourth (memory) locations and (ii) applying a location signal to said control circuit representative of an address location being written to.

6. The apparatus as claimed in claim 5, wherein said control circuit is further configured to control said first and said second registers and said calculation circuit in response to said location signal.

7. The apparatus as claimed in claim 6, wherein said control circuit is further configured to instruct said calculate circuit to calculate said address in response to one of the following:
  said X coordinate being written to a preselected one of said first and said second locations; and
  said Y coordinate being written to a preselected one of said third and said fourth locations.

8. The apparatus as claimed in claim 1, further comprising:
  a style table for storing data corresponding to a predetermined pattern for said pixel; and
  a style counter for (i) indexing said data in said style table and (ii) generating a style data signal corresponding to said indexed data.

9. The apparatus as claimed in claim 8, wherein said style table is configured to store a non-repeating bit pattern up to a predetermined length for a drawing operation.

10. The apparatus as claimed in claim 8, wherein (i) a first register of said registers is memory mapped to a first location, a second location, a third location and a fourth location in said first address range and (ii) a second register of said registers is memory mapped to a fifth location, a sixth location, a seventh location and an eighth location in said first address range; and
  said apparatus further comprising an address decoder for (i) monitoring said first to said eighth locations, (ii) generating a location signal representative of an address location being written to and (iii) indexing said style counter in response to said address location being written to.

11. An apparatus for generating a region of graphics on a display, the apparatus comprising:
  a register accessible via a bus for storing coordinates of a pixel to be dawn on said display;
  a calculation circuit for calculating an address in a memory directly connected to said bus for storage of data corresponding to said pixel in response to said coordinates;
  a control circuit for controlling said register and said calculation circuit to cause said data to be stored in said memory across said bus by driving said address onto said bus, wherein said calculation circuit is configured to output said address in a first part and a second part, said first part comprising a word address corresponding to said address in said memory and representing a single memory word and said second part comprising a bit address representing a position of said pixel data within said single memory word;
  a second register for storing said pixel data in said single memory word prior to said single memory word being written to said address in said memory;
  a logic unit for writing data to said second register in dependence on said address calculated by said calculation circuit, wherein said logic unit combines data for at least two pixels to be drawn in dependence on said address of each of said pixel to permit storage of said data for said pixels in said single memory word; and
  a comparator connected to said calculation circuit for (i) receiving said addresses, (ii) comparing said addresses of consecutive said pixels to be drawn and (iii) generating a same address signal if said addresses are identical.

12. The apparatus as claimed in claim 11, wherein said control circuit is further configured to combine said data for said pixels in response to a receipt of said same address signal.

13. A method of generating a region of graphics on a display, the method comprising:
  (A) storing an X coordinate for a pixel to be drawn in said region in a first address range of a bus;
  (B) storing a Y coordinate for said pixel in said first address range;
  (C) calculating an address in a second address range of said bus for storage of data corresponding to said pixel in dependence on said X and said Y coordinates;
  (D) controlling writing of said data across said bus into a memory directly connected to said bus by driving said address onto said bus; and
  (E) memory mapping a first register storing said X coordinate to a first location and a second location in said first address range;
  (F) memory mapping a second register storing said Y coordinate to a third location and a fourth location in said first address range;
  (G) comparing said X and said Y coordinates with predetermined clipping limits; and
  (H) discarding said pixel data in response to at least one of said X and said Y coordinates exceeding said predetermined clipping limits.

14. The method as claimed in claim 13, further comprising:
  monitoring said first, said second, said third and said fourth locations for a write.

15. The method as claimed in claim 14, further comprising:
  calculating said address for said pixel in response to one of the following:
  said X coordinate being written to a preselected one of said first and said second locations; and
  said Y coordinate being written to a preselected one of said third and said fourth locations.

16. The method as claimed in claim 13, further comprising:
  storing style data corresponding to a predetermined pattern for said pixel;
  indexing said style data; and
  generating a style data signal corresponding to said style data as indexed.

17. The method as claimed in claim 16, further comprising:
selecting a color for said pixel to be drawn in dependence on said style data signal.

18. The method as claimed in claim 13, further comprising:
storing said data in a single memory word prior to said single memory word being written to said address in said memory in dependence on the word address or a bit address.

19. The method as claimed in claim 13, further comprising:
combining data for at least two pixels to be drawn in dependence on a word address of each of said pixels to permit storage of said data for said pixels in a single memory word.

20. The method as claimed in claim 19, further comprising:
comparing said word address of consecutive pixels to be drawn; and
combining said data for said pixels if said word addresses are identical.

21. An apparatus for generating a region of graphics on a display, the apparatus comprising:

means for storing an X coordinate for a pixel to be drawn in said region in a first address range of a bus;

means for storing a Y coordinate for said pixel in said first address range;

means for calculating an address in a second address range of said bus for storage of data corresponding to said pixel in dependence on said X and said Y coordinates;

means for controlling writing of said data across said bus into a memory directly connected to said bus by driving said address onto said bus;

means for (i) memory mapping a first register storing said x coordinate to a first location and a second location in said first address range and (ii) memory mapping a second register storing said y coordinate to a third location and a fourth location in said first address range;

means for comparing said x and said y coordinates with predetermined clipping limits; and means for discarding said x and y coordinates exceeding said predetermined clipping limits.

* * * * *